(12) United States Patent
Song et al.

(10) Patent No.: US 9,076,060 B2
(45) Date of Patent: Jul. 7, 2015

(54) PARKING LOT MANAGEMENT SYSTEM IN WORKING COOPERATION WITH INTELLIGENT CAMERAS

(75) Inventors: Yoo-Seung Song, Daejeon (KR); Sang-Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 415 days.

(21) Appl. No.: 13/565,010

(22) Filed: Aug. 2, 2012

(65) Prior Publication Data

US 2013/0147954 A1    Jun. 13, 2013

(30) Foreign Application Priority Data

Dec. 13, 2011  (KR) .................... 10-2011-0133515

(51) Int. Cl.
| | | |
|---|---|---|
| *H04N 7/18* | (2006.01) | |
| *G06K 9/32* | (2006.01) | |
| *G08G 1/017* | (2006.01) | |
| *G08G 1/04* | (2006.01) | |
| *G06K 9/20* | (2006.01) | |
| *G08G 1/14* | (2006.01) | |
| *G06K 9/00* | (2006.01) | |

(52) U.S. Cl.
CPC ............... *G06K 9/325* (2013.01); *H04N 7/181* (2013.01); *H04N 7/185* (2013.01); *G08G 1/0175* (2013.01); *G08G 1/04* (2013.01); *G06K 9/209* (2013.01); *G08G 1/146* (2013.01); *G06K 9/00771* (2013.01)

(58) Field of Classification Search
CPC ....... G08G 1/017; G08G 1/065; G08G 1/123; G08G 1/14; G08G 1/146; G08G 1/147; G08G 1/148
USPC .......................... 348/148, 143, 149, 159, 104; 340/932.2, 995.19, 937, 933
See application file for complete search history.

(56) References Cited

U.S. PATENT DOCUMENTS

| | | | |
|---|---|---|---|
| RE38,626 E * | 10/2004 | Kielland | 340/937 |
| 7,116,246 B2 * | 10/2006 | Winter et al. | 340/932.2 |
| 7,821,423 B2 * | 10/2010 | Lee | 340/932.2 |

FOREIGN PATENT DOCUMENTS

KR    10-2010-0092643 A    8/2010

OTHER PUBLICATIONS

Jin-Gwan NA et al., "Parking management system using network cameras", Autumn Academic Conference of Korean Institute of Industrial Engineers, 2005.

* cited by examiner

*Primary Examiner* — Trang U Tran
(74) *Attorney, Agent, or Firm* — Rabin & Berdo, P.C.

(57) ABSTRACT

A parking lot management system that works in cooperation with intelligent cameras is disclosed. The system includes a plurality of intelligent cameras connected to each other via a wired/wireless mesh network, a license plate recognition unit which can recognize a license plate of a vehicle entering and exiting a parking lot, a server for storing and managing information about the vehicle, a parking information board and a vehicle information about the position terminal which provide a user with parking information, and a personal computer for controlling all information.

11 Claims, 10 Drawing Sheets

PARKING LOT MANAGEMENT SYSTEM IN WORKING COOPERATION WITH INTELLIGENT CAMERAS

CROSS-REFERENCE TO RELATED APPLICATIONS

This application claims priority to Korean Patent Application No. 10-2011-0133515, filed on Dec. 13, 2011, which is incorporated herein by reference in its entirety.

BACKGROUND OF THE INVENTION

1. Field of the Invention

Exemplary embodiments of the present invention relate to a technique for managing vehicle parking using intelligent cameras.

2. Description of Related Art

As parking facilities are increasing in number and becoming bigger and bigger, it is crucial to offer effective and convenient parking service to customers who utilize indoor or outdoor parking lots of, for example, large department stores. In particular, in the case of large parking lots, several parking systems have been introduced and used to enable customers to conveniently park their vehicles. Most of those are services capable of automatically collecting parking fees using a license plate recognition device installed at the entrance of the parking lot, and informing the customer of the number of spots available for parking on every floor by simply calculating the number of vehicles entering and exiting the parking lot.

In order to provide more accurate information about the number of parked vehicles and the parked positions of the vehicles, a detector sensor or video camera is installed on each parking spot. Since the above methods can determine the license plate number of the vehicle parked in each parking spot, it can provide the accurate parked position when the customer's vehicle leaves. The above methods have a problem in that a large number of devices such as sensors and cameras are required in the case of the large parking lot, and thus the maintenance thereof is not easy, which increases costs.

In addition, a method of calculating the number of the vehicles that can be parked in the parking lot using image information only has also been utilized. However, the above method has a problem in that, since it is not possible to recognize the license plate number of the vehicle parked in the parking spot, the information about the position of the vehicle parked in the parking lot is not provided to a customer. As a result, a technique for providing the customer with an accurate parking position of the vehicle using a smaller number of network cameras is needed, in order to reduce maintenance costs.

Korean Unexamined Patent Publication No. 2009-0011871 discloses a technique of effectively providing a driver with a parking position by recognizing a license plate number of a vehicle as an image and varying the transmission speed of data as necessary. However, the above technique has a problem in that a camera must be installed at every parking spot in order to recognize the information about the vehicle parked in the parking spot.

SUMMARY OF THE INVENTION

An embodiment of the present invention is directed to a method of providing a driver with accurate parking information by managing the position of a parking spot in which a vehicle is parked, and a license plate number of the parked vehicle through a function of recognizing the parking spot based on an image obtained by the use of intelligent network cameras and a function of cooperating with the intelligent network cameras.

Other objects and advantages of the present invention can be understood by the following description, and will become apparent with reference to the embodiments of the present invention. Also, it will be obvious to those skilled in the art to which the present invention pertains that the objects and advantages of the present invention can be realized by the means as claimed and combinations thereof.

In accordance with an embodiment of the present invention, a parking management apparatus includes a server; a plurality of intelligent cameras which detect a vehicle through image recognition to create information about the position of a vehicle and an object ID of the vehicle, and send the information about the position and the object ID to the server; a vehicle recognition unit configured to obtain a license plate number of the vehicle and an entry time of the vehicle and to send the license plate number of the vehicle and the entry time of the vehicle to the server; and a display device configured to display at least one of the information about the position, the license plate number, the entry time, and an image of the vehicle, wherein when the detected vehicle moves into a hand-over region in which visual fields of at least two intelligent cameras overlap, the server sends the object ID to another intelligent camera which shares with the visual field.

The display device may include a vehicle information about the position terminal and a parking information board, and the vehicle information about the position terminal may receive the information about the vehicle from the server and display the information.

In the case in which there is no hand-over region when the vehicle is moving, the server may send the object ID to an intelligent camera located in a region into which the vehicle is expected to move using a tracing function with a Kalman filter.

The plurality of intelligent cameras may determine whether a vehicle is parked in a parking area managed by the respective intelligent cameras using a background/panoramic map based algorithm, and store the object ID of the parked vehicle.

The plurality of intelligent cameras may detect an image of the vehicle using a dynamic saliency map algorithm, and after the image is detected, the plurality of intelligent cameras may detect image information of the vehicle using binary coding and morphological processes.

The plurality of intelligent cameras may maintain the image information of the vehicle for a predetermined period of times when a large portion of the moving vehicle is hidden by an obstacle.

The parking management apparatus may further include a control personal computer configured to monitor the information about the position of the vehicle and the object ID of the vehicle, which are managed by the server. The server may display the information sent from the intelligent camera on a GUI device of the control personal computer, and present a parking region which is automatically assumed using a straight-line detecting algorithm.

In accordance with another embodiment of the present invention, a parking management server includes a transmission unit configured to send and receive information from a plurality of intelligent cameras or a control unit, wherein the control unit includes an object ID managing section, an operation section, and a hand-over region setting section for setting a hand-over region among the plurality of adjacent intelligent cameras, and the operation section sends the object ID of the vehicle from the object ID managing section through the transmission unit to adjacent intelligent camera when the vehicle detected by the respective intelligent cameras moves into a hand-over region.

In the case in which there is no hand-over region when the vehicle is moving, the operation may send the object ID of the vehicle, which is received from the object ID managing section, to an adjacent intelligent camera using a tracing function with a Kalman filter.

In accordance with another embodiment of the present invention, a parking management method includes detecting a vehicle using a vehicle recognizing device or a plurality of intelligent cameras to create information about the vehicle; sending the created information to a server; determining whether the vehicle moves into a hand-over region in which visual fields of the plurality of adjacent intelligent cameras overlap; and sending information about the vehicle to another intelligent camera which monitors the hand-over region, when the vehicle moves into the hand-over region.

The parking management method may further include sending an object ID of the vehicle, which is received from an object ID managing section, to other intelligent camera using a tracing function with a Kalman filter, in the case in which the vehicle is out of a visual field of the intelligent camera that detects the vehicle while the vehicle moves into a region having no hand-over region.

With the configuration of the present invention, since the position of the parking spot in which the vehicle is parked and the information about the vehicle can be accurately determined using only a small number of intelligent cameras, it is possible to provide a customer with accurate parking information.

DESCRIPTION OF SPECIFIC EMBODIMENTS

Figure 1:
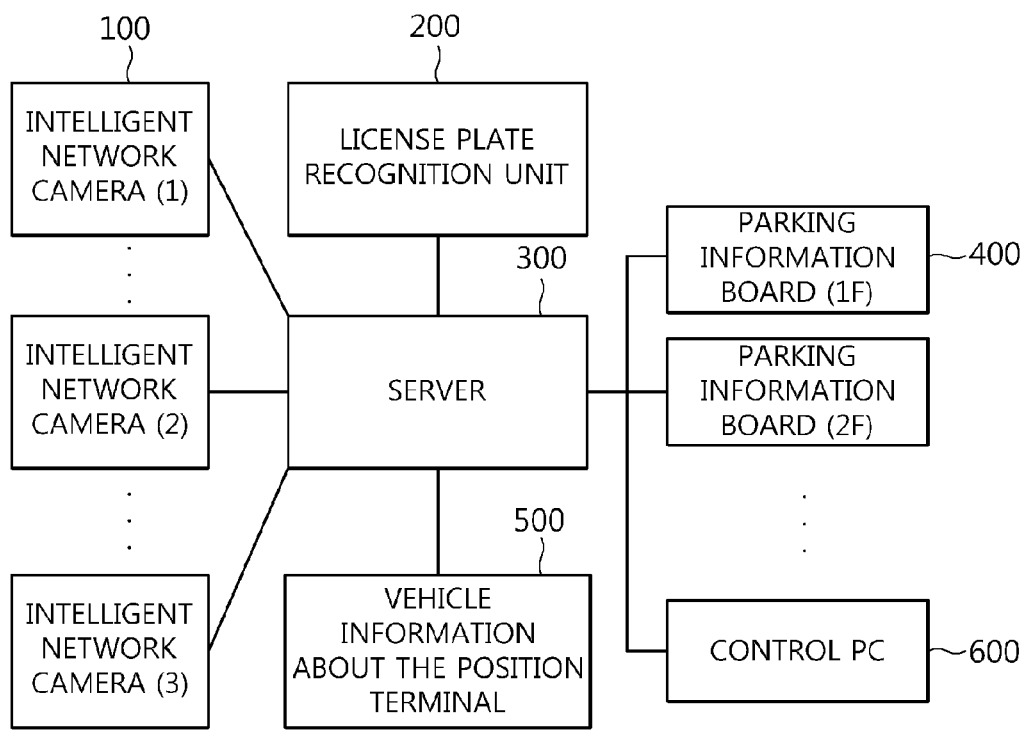
FIG. 1 is a diagram illustrating a parking lot management system that works in cooperation with intelligent cameras.

Exemplary embodiments of the present invention will be described below in more detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The configuration and embodiments of the present invention will now be described in detail with reference to the accompanying drawings.

First, FIG. 1 is a diagram illustrating a parking lot management system that works in cooperation with intelligent cameras. The system includes a plurality of intelligent cameras 100 connected to each other via a wired/wireless mesh network, a license plate recognition unit 200 which can recognize a license plate of a vehicle entering and exiting a parking lot, a server 300 for storing and managing information about the vehicle, a parking information board 400 and a vehicle information about the position terminal (kiosk) 500 which provide a user with parking information, and a personal computer (PC) 600 for controlling all information. Alternatively, the system may not include the license plate recognition unit 200 and the vehicle information about the position terminal. The concrete operation of the system shown in FIG. 1 will be described in detail hereinafter.

Figure 2:
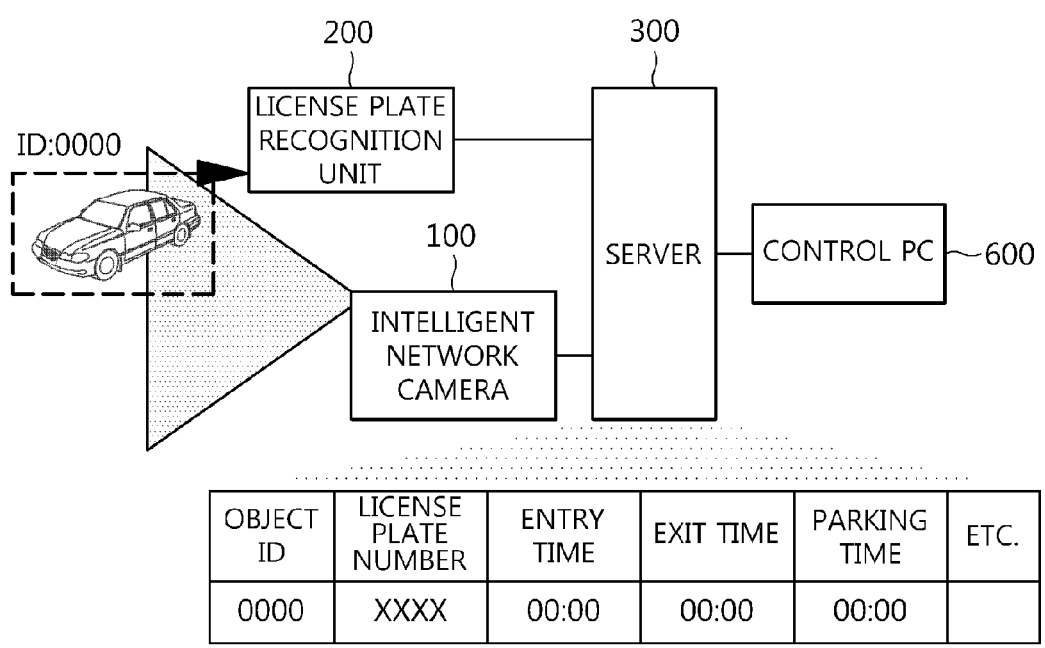
FIG. 2 is a diagram illustrating a system of recognizing and transmitting information about a vehicle.

FIG. 2 illustrates a start point, at which a vehicle entering the parking lot is first managed. A method of creating and transmitting necessary information will be described with reference to FIG. 2. First, basic information about the entering vehicle, that is, the license plate number, the entry time, and the like, is obtained by the vehicle recognition device 200, and is then transmitted to the server 300. Simultaneously, the intelligent camera 100 detects the vehicle through the image recognition and creates an object ID for use in sending the information to the server. The server 300 manages the object ID, the license plate number, the entry time, and so forth, and this information can also be monitored by the control personal computer 600. On the contrary, when the parked vehicle exits the parking spot, the server calculates the exit time and the parking time of the vehicle of interest for providing information for the calculation of the parking fee. Accordingly, when the vehicle enters or exits the parking lot, the object ID, the license plate number, the entry time, the exit time, and the parking time of the vehicle of interest are stored and managed by the server as Table 1 below.

Table 1 shows an example in which the server manages the profile of a vehicle entering the parking lot. It can be seen that the object ID created by the intelligent camera is managed, as well as the license plate number of the vehicle. The information to be managed in Table 1 is not limited thereto, and other information may be added as necessary.

TABLE 1

| Object ID | License plate No. | Entry time | Exit time | Parking Time | Parking Position | Etc. |
|---|---|---|---|---|---|---|
| 0001 0002 ... | 0000 | 00:00 | 00:00 | 00:00 | 0000 | |

Figure 3:
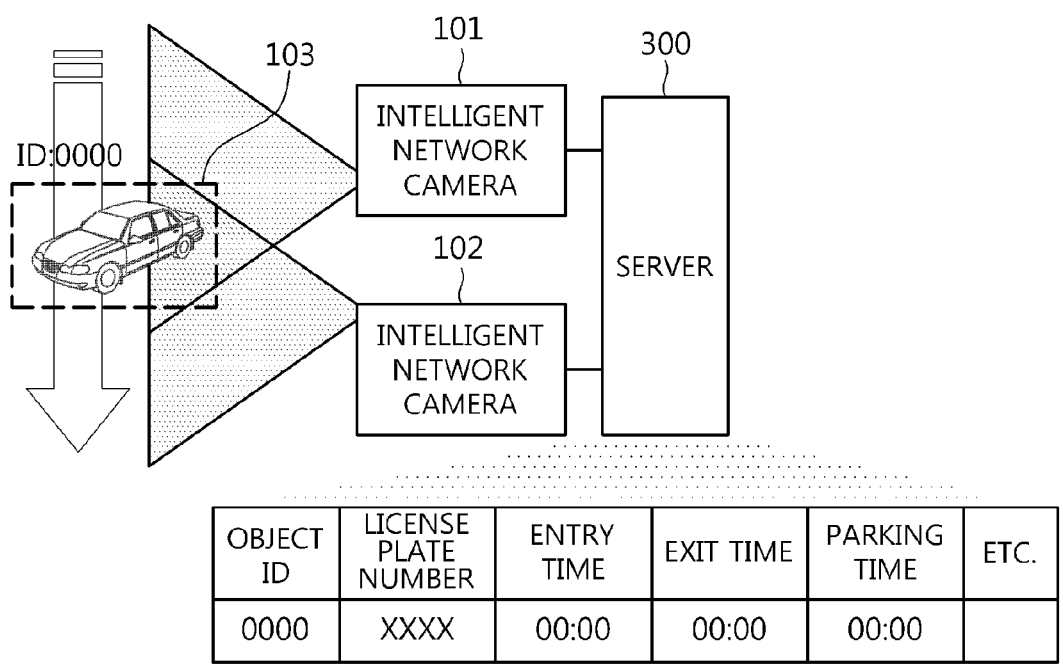
FIG. 3 is a diagram illustrating a system of tracing and managing a moving vehicle.

FIG. 3 illustrates the technique of continuously sending the information about the vehicle moving in the parking lot to other cameras. If the vehicle managed by the intelligent camera 101 moves into a region managed by another intelligent camera 102, the object ID of the vehicle managed by the intelligent camera 101 is also sent to the other intelligent camera 102, so that it is possible to constantly trace and manage vehicles over the entire area of the parking lot. In this instance, the information is sent between the two intelligent cameras in a hand-over region 103. The vehicle is traced and managed using the same object ID, and the parking time or the like of the vehicle of interest is continuously managed by the server, without any change.

In the case in which there is no hand-over region 103, such as that shown in FIG. 3, the information is sent between two adjacent intelligent cameras through a tracing function using a Kalman filter. In the case in which there is no hand-over region, the closest vehicle moving route is set, and dynamic tracing information about the moving vehicle obtained by the Kalman filter in the region of the intelligent camera 101 is converted into dynamic information in the region of the other intelligent camera 102. The information about the moving object created by the other intelligent camera 102 is updated with the result of the conversion. In order to update the object information about the vehicle between two adjacent intelligent cameras, temporal and spatial distances can be used as similarity measures in the set region to assign the information about the vehicle even when a plurality of objects are moving.

Figure 4:
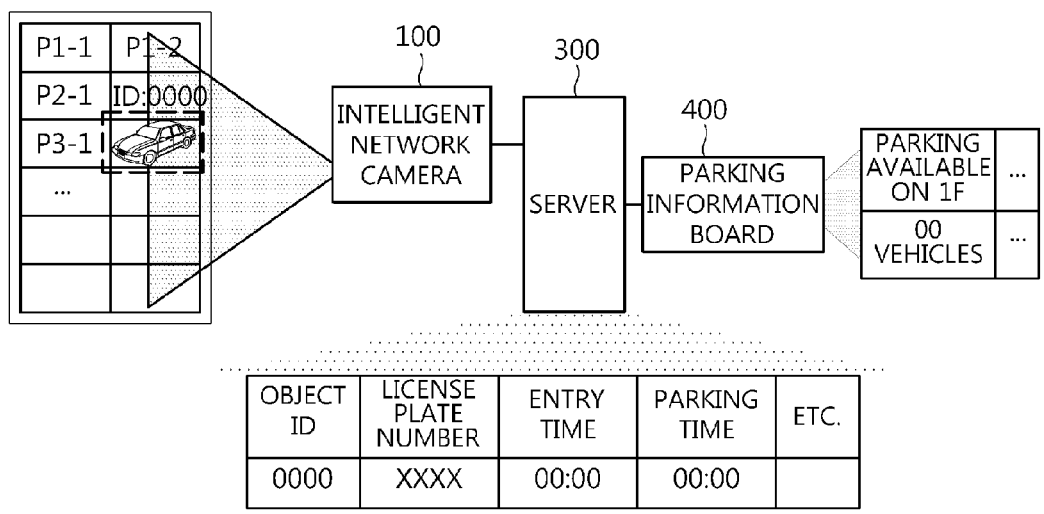
FIG. 4 is a diagram illustrating a system of managing information about a vehicle parked in a parking spot and information about the parking spot.

FIG. 4 illustrates a method of sending information to the server and the parking information board when the vehicle entering the parking lot is parked in the parking spot. The intelligent camera creates the ID of the moving object, continuously traces it, and also sends the information about the vehicle of interest, which is parked in the parking area, and the parking position to the server. As shown in FIG. 4, the intelligent camera 100 divides the parking area into several spaces in advance, and maintains the position (address/number) of the parking spot for each space. If a vehicle is parked in the parking spot of interest, the intelligent camera 100 sends the information to the server 300. When the parking spot is defined by parking lines, information about the position of one vehicle is generally provided. However, since the parking spot may not be defined by parking lines, or vehicles may be parked across multiple parking spots, the information about the position of the parking spot includes information about the position of a parking area in which several vehicles can be parked. When a vehicle is parked, the information about the position of the parking spot is sent to and stored in the server 300 through the intelligent camera, and simultaneously, the server 300 calculates the information about the number of vehicles that can be parked in the parking area of interest to update the information about the parking information board 400.

Figure 5:
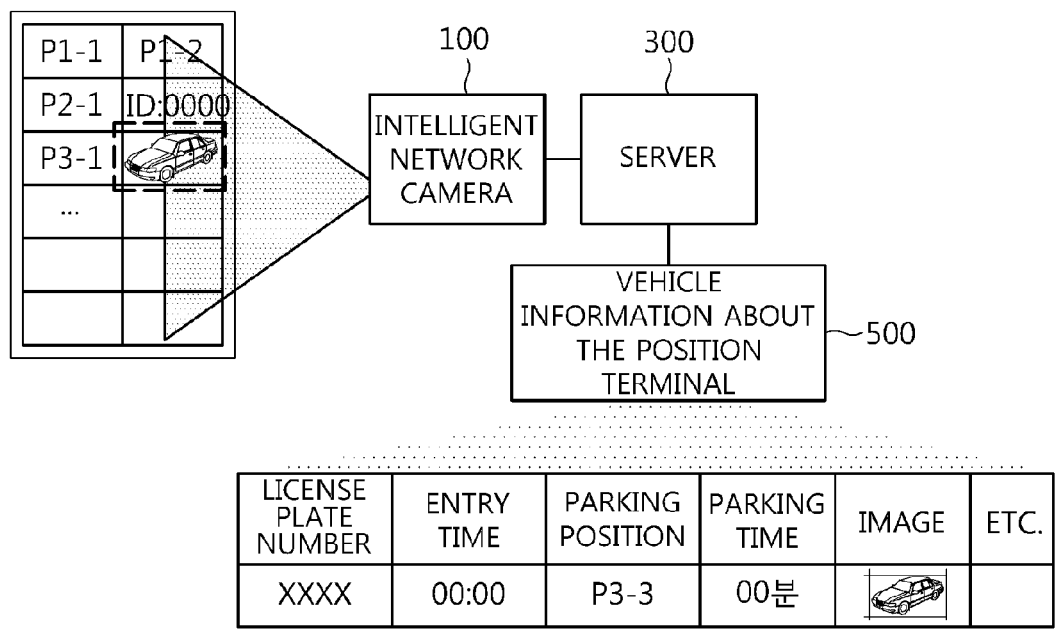
FIG. 5 is a diagram illustrating a system of outputting information about a vehicle to a terminal.

FIG. 5 illustrates a system for outputting the information about the position of the vehicle from the server to a monitor to allow a user (customer) to check her or his vehicle. The user can verify the information about the parked vehicle, which is provided by the server 300, from the terminal 500, such as kiosk, displaying the information about the position of the vehicle, that is, the entry time, the parking position, the parking time, and so forth. In addition, the user can verify the image or still cut of the parked vehicle, which is taken by the intelligent camera 100, from the terminal.

Figure 6:
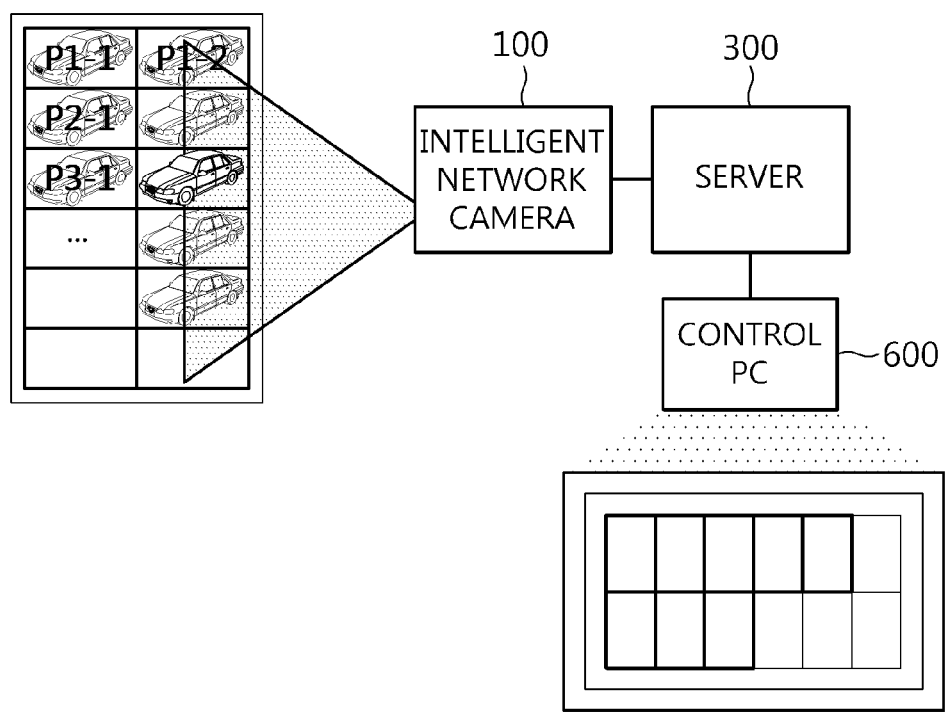
FIG. 6 is a diagram illustrating a method of setting a parking area.

FIG. 6 illustrates a method of setting the parking areas to be managed by the intelligent camera in the server. The server 300 displays the image transmitted from the intelligent camera 100 on a GUI device of the control personal computer 600, and inputs the parking area to be managed. In this instance, the server 300 is configured to present a parking area which is automatically assumed using a straight-line detecting algorithm, such as Hough transform, so that the user can select or collect the presented area to re-enter the area. The set information about the parking area is again sent to the intelligent camera 100.

Figure 7:
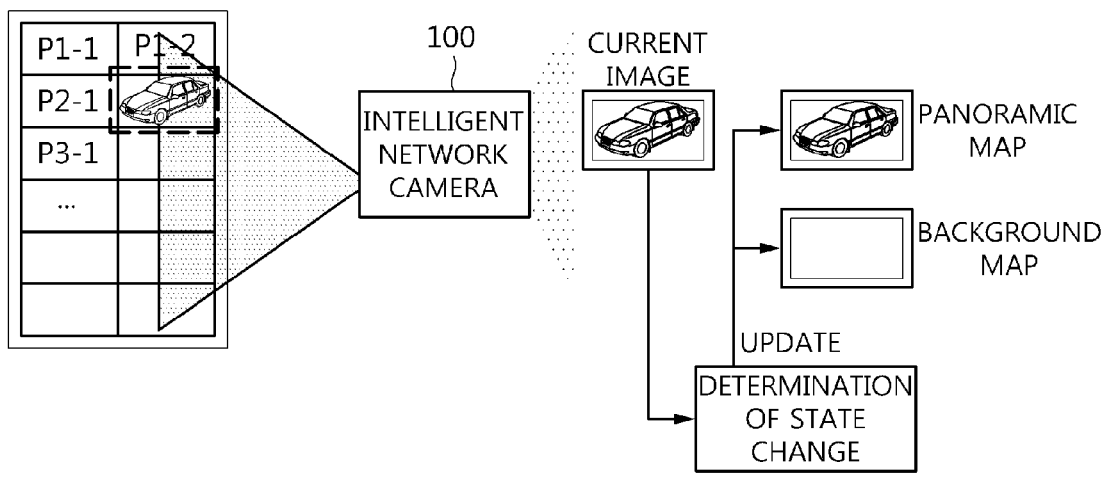
FIG. 7 is a diagram illustrating a method of managing a parking area.

FIG. 7 illustrates a method of managing the parking area. The intelligent camera 100 locally manages the parking state of the parking area to be managed and the ID of the vehicle. The intelligent camera 100 determines whether a vehicle is parked in each parking area, and when the vehicle moves from one parking spot to another parking spot, the ID of the parked vehicle is stored in the intelligent camera 100 using the ID of the vehicle transferred from the moving vehicle detecting unit. The algorithm of determining whether the vehicle is parked utilizes a background/panoramic map based algorithm. The background map and the panoramic map are represented by the mean and variance of an image value of the area of interest, and when an image value does not deviate from a desired variance value, the mean and the variance are updated at predetermined intervals so as to maintain the current state, whereby the state is not changed, even by noise. If the current value deviates by a predetermined variation value from a previously obtained mean, it is converted into the background/panoramic map.

Figure 8:
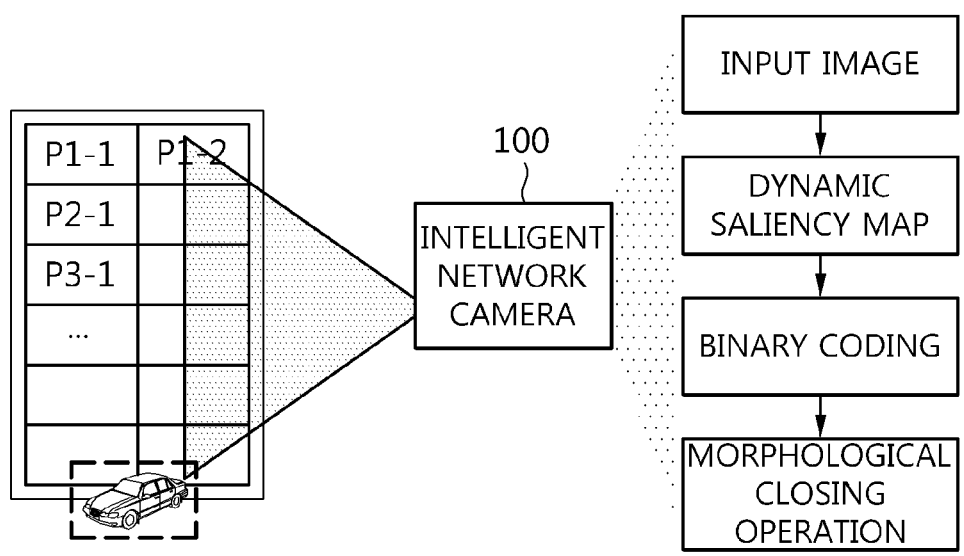
FIG. 8 is a diagram illustrating an algorithm for detecting a moving vehicle.

FIG. 8 illustrates a method of detecting the moving vehicle through a dynamic saliency map algorithm and a morphological image process in the intelligent camera 100. The saliency map is an algorithm for detecting a distinguishable object among surrounding image information by performing several steps of Gaussian smoothing and difference operation on useful image features in input images. The dynamic saliency map is an algorithm capable of detecting temporal changes based on the previous image information, in addition to the function of the existing saliency map, and is used to detect the moving vehicle in the parking lot. Noise is removed from the image through binary coding and morphological processes to detect the vehicle object. In this instance, when a large portion of the moving vehicle is hidden by another parked vehicle, since the information about the vehicle of interest is maintained for a predetermined period of times, the information about the vehicle does not disappear.

Figure 9:
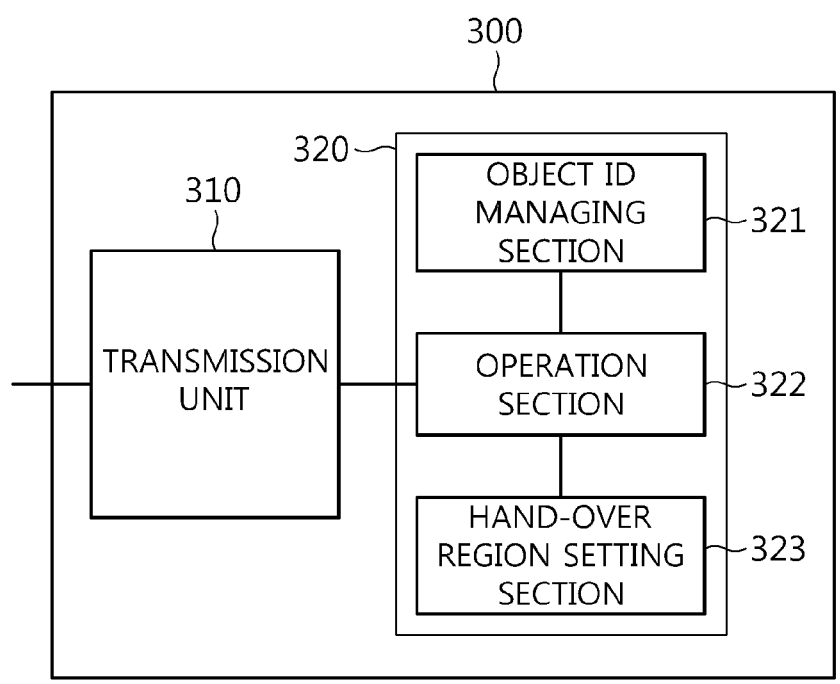
FIG. 9 is a diagram illustrating a server according to the present invention.

FIG. 9 is a diagram illustrating the server 300 according to the present invention. The server 300 of the present invention includes a transmission unit 310, for sending and receiving the information from the intelligent cameras or the control personal computer, and a control unit 320. The control unit 320 includes an object ID managing section 321, an operation section 322, and a hand-over region setting section 323 for setting the hand-over region among the plurality of adjacent intelligent cameras 100. The operation section 322 sends the object ID of the vehicle from the object ID managing section 321 through the transmission unit 310 to the adjacent intelligent camera when the vehicle detected by the respective intelligent cameras 100 moves into the hand-over region. In the case in which there is no hand-over region when the vehicle is moving, the operation section 322 sends the object ID to the adjacent intelligent camera through the transmission unit 310 by the use of the tracing function with the Kalman filter.

Figure 10:
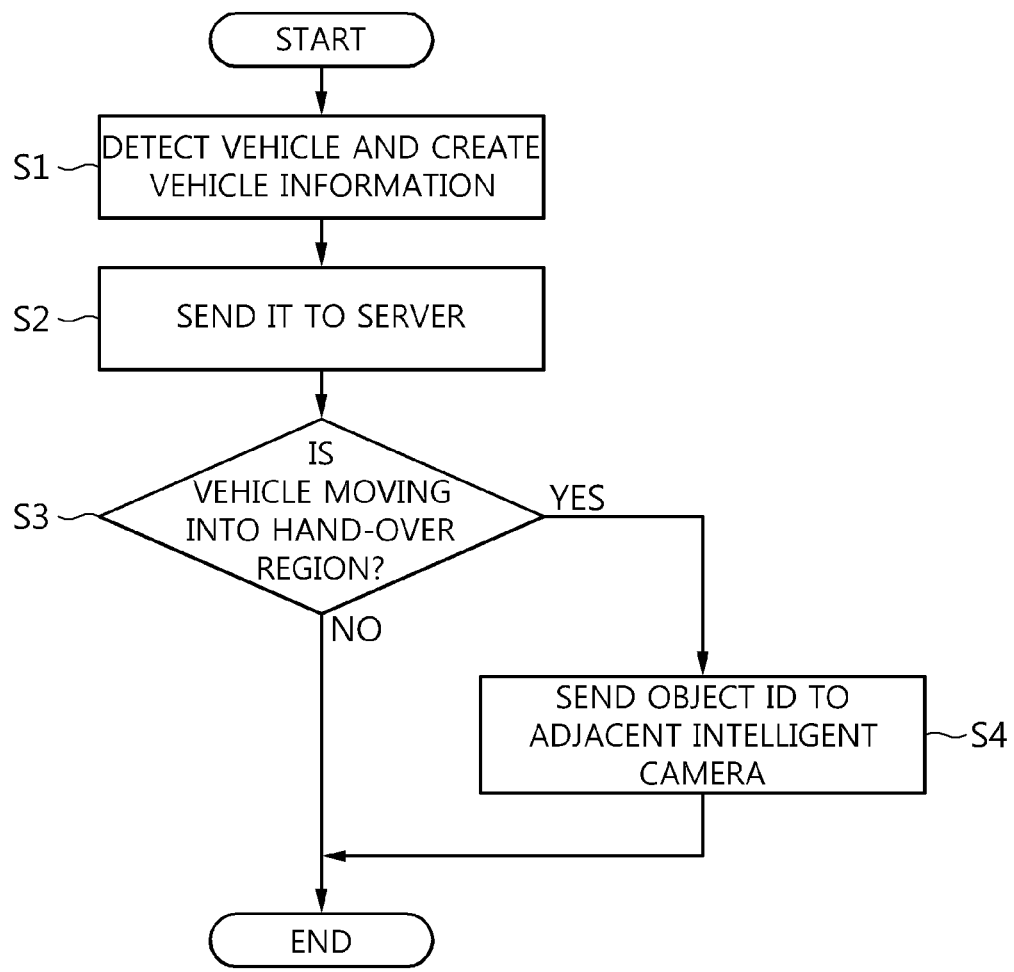
FIG. 10 is a flowchart illustrating a parking management method according to the present invention.

FIG. 10 is a flowchart illustrating a parking management method according to the present invention. The parking management method of the present invention includes a step of detecting the vehicle using a vehicle recognizing device or an intelligent camera to create the information about the vehicle (S1), a step of sending the created information to the server (S2), and when the vehicle moves into the hand-over region (s3), a step of sending the object ID of the vehicle to the adjacent intelligent camera (S4).

In the case in which the vehicle moves into a region having no hand-over region and thus is out of the visual field of the intelligent camera detecting the vehicle, the parking management method of the present invention may include a step of sending the object ID of the vehicle, which is received from the object ID managing section, to the adjacent intelligent camera through the transmission unit by the use of the tracing function with the Kalman filter.

While the present invention has been described with respect to specific embodiments thereof, it will be apparent to those skilled in the art that various changes and modifications may be made without departing from the spirit and scope of the invention as defined in the following claims.

What is claimed is:

1. A parking management apparatus comprising:
   a server;
   a plurality of intelligent cameras which detect a vehicle through image recognition to create information about the position of the vehicle and an object ID of the vehicle, and send the information about the position and the object ID to the server;
   a vehicle recognition unit configured to obtain a license plate number of the vehicle and an entry time of the vehicle and to send the license plate number of the vehicle and the entry time of the vehicle to the server; and
   a display device configured to display at least one of the information about the position, the license plate number, the entry time, and an image of the vehicle,
   wherein when the detected vehicle moves into a hand-over region in which visual fields of at least two intelligent cameras overlap, the server sends the object ID to another intelligent camera which shares with the visual field; and
   wherein the intelligent cameras are connected to each other via a wired or wireless mesh network.

2. The parking management apparatus of claim 1, wherein the display device comprises a vehicle information about the position terminal and a parking information board, and the vehicle information about the position terminal receives the information about the vehicle from the server and displays the information.

3. The parking management apparatus of claim 1, wherein in a case in which there is no hand-over region when the vehicle is moving, the server sends the object ID to an intelligent camera located in a region into which the vehicle is expected to move using a tracing function with a Kalman filter.

4. The parking management apparatus of claim 1, wherein the plurality of intelligent cameras determines whether a vehicle is parked in a parking area managed by the respective intelligent cameras, using a background/panoramic map based algorithm, and store the object ID of the parked vehicle.

5. The parking management apparatus of claim 1, wherein the plurality of intelligent cameras detects an image of the vehicle using a dynamic saliency map algorithm, and after the image is detected, the plurality of intelligent cameras detects image information of the vehicle using binary coding and morphological processes.

6. The parking management apparatus of claim 5, wherein the plurality of intelligent cameras maintains the image information of the vehicle for a predetermined period of times when a large portion of the moving vehicle is hidden by an obstacle.

7. The parking management apparatus of claim 1, further comprising a control personal computer configured to monitor the information about the position of the vehicle and the object ID of the vehicle, which are managed by the server,
   wherein the server displays the information sent from the intelligent camera on a GUI device of the control personal computer, and presents a parking region which is automatically assumed using a straight-line detecting algorithm.

8. A parking management server comprising:
   a transmission unit configured to send and receive information from a plurality of intelligent cameras or a control personal computer;
   and a control unit,
   wherein the control unit includes an object ID managing section, an operation section, and a hand-over region setting section for setting a hand-over region among the plurality of adjacent intelligent cameras, and
   wherein the operation section sends the object ID of the vehicle from the object ID managing section through the transmission unit to adjacent intelligent camera when the vehicle detected by the respective intelligent cameras moves into a hand-over region; and
   wherein the intelligent cameras are connected to each other via a wired or wireless mesh network.

9. The parking management server of claim 8, wherein in a case in which there is no hand-over region when the vehicle is moving, the operation section sends the object ID of the vehicle, which is received from the object ID managing section, to an adjacent intelligent camera using a tracing function with a Kalman filter.

10. A parking management method comprising:
    detecting a vehicle using a vehicle recognizing device or a plurality of intelligent cameras to create information about the vehicle;
    sending the created information to a server;
    determining whether the vehicle moves into a hand-over region in which visual fields of the plurality of adjacent intelligent cameras overlap; and
    sending information about the vehicle to another intelligent camera which monitors the hand-over region, when the vehicle moves into the hand-over region;
    wherein the intelligent cameras are connected to each other via a wired or wireless mesh network.

11. The parking management method of claim 10, further comprising sending an object ID of the vehicle, which is received from an object ID managing section, to other intelligent camera using a tracing function with a Kalman filter, in a case in which the vehicle is out of a visual field of the intelligent camera that detects the vehicle while the vehicle moves into a region having no hand-over region.

* * * * *